Aug. 29, 1939.  L. KELLENBERGER  2,170,925
BELT DRIVE
Filed July 16, 1937
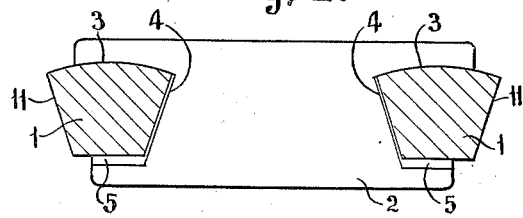
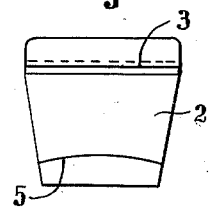
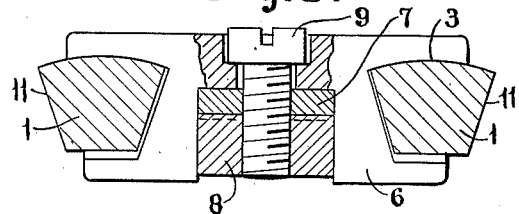
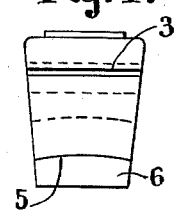
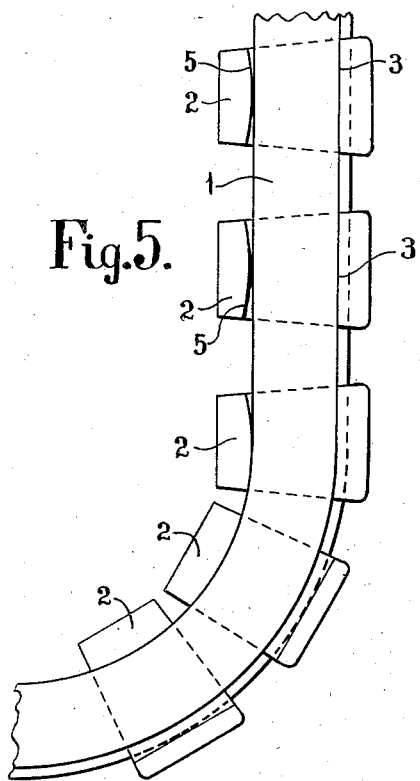
Inventor.
Leonhard Kellenberger.
per Ferdinand Broster Bosshardt
Attorney.

Patented Aug. 29, 1939

2,170,925

UNITED STATES PATENT OFFICE 2,170,925

BELT DRIVE

Leonhard Kellenberger, St. Gallen, Switzerland

Application July 16, 1937, Serial No. 153,960
In Germany July 28, 1936

2 Claims. (Cl. 74—236)

This invention relates to driving belts such as are used for infinitely variable wedge belt drives suitable for driving apparatuses and machinery.

The object of my invention is to provide a driving belt which utilises standard elastic endless wedge belts and which enables the said wedge belts to be readily changed when worn, whilst also allowing the other driving surface of each belt to be used when the other has become worn and also providing automatic equalization of slight irregularities in the shape and lengths of the said standard belts.

I attain this object by the means illustrated in the accompanying drawing, wherein—

Figures 1 and 3 are views in cross-section showing different constructions of wedge belts.

Figures 2 and 4 are detached side views of details of the said constructions.

Figure 5 is a detached side view of a fragment of wedge belt constructed in accordance with Figures 1 and 2.

The cross pieces are so constructed and preferably so held by an auxiliary belt that the belt proper can consist of two endless wedge belts which are not weakened or spoiled by holes for screws, rivets and so forth, and therefore have a much longer durability.

The use of standard wedge belts 1 is rendered possible by stiff cross pieces 2 which are so arranged between the belts 1 at spaced distances from one another crosswise of the direction in which the belts run that they hold the belts by mouth-like slots 3, 4, 5 a uniform distance apart.

In the construction shown in Figures 1 and 2, the wedge belts 1 are pressed into the cross piece 2 from each side and are readily removable therefrom for replacement purposes. The slots 3, 4, 5 keep the two wedge belts 1, 1 at a predetermined distance from each other. In the construction shown in Figures 3 and 4, the cross piece 6 acts in the same way on the wedge belts 1, but is guided and held by a flat, endless belt 7 which extends through an aperture in the cross piece and is secured thereto by a nut 8 and bolt 9. The flat belt 7 is situated between the wedge belts 1.

Where the pulley diameter in use is small, and the belts are therefore liable to great curvature, see Figure 5, an undesirable pressing of edges into the belts is avoided by rounding off the sides 5 of the slots 3, 4, 5 to a corresponding radius. A slight rounding of the sides 4 of the slots is also desirable, unless belts 12 with single wedge surfaces are employed, in which case the rounding of the sides 4 can be omitted.

I claim—

1. A driving belt comprising two unmutilated complete endless elastic wedge section standard driving belts each having two oppositely slanting driving surfaces of equal degree of obliquity and maintained at a spaced lateral distance apart solely by a plurality of one-piece cross-stays each extending uninterruptedly from one belt to the other in a straight line at right angles to the said belts, mouth-like three-sided slots being provided in the ends of the cross-stays and the said belts engaging and fitting with an easy push fit in the said slots in an easily removable and interchangeable manner and having no other connection whatever to all of the cross-stays than that formed by the easy push fit engagement of the belts with the said slots.

2. A driving belt comprising in combination, a plurality of straight cross-stays each formed in a single piece, a mouth-like three-sided slot of invariable size in each end of each cross-stay, a slot of invariable size in the underside of each cross-stay, two unmutilated, interchangeable identically cross-sectioned standard endless elastic wedge driving belts each having two driving faces one of which abuts against the correspondingly inclined inner end of one slot in each cross-stay, the said cross-stays and slots being the sole means of keeping the said driving belts spaced laterally apart, a cross-stay connecting and holding belt spaced laterally apart from the driving belts and engaging the slot in the underside of each cross-stay, a screw extending through each cross-stay and connecting and holding belt and a nut situated in the slot in each cross-stay and engaged by the respective screw.

LEONHARD KELLENBERGER.